United States Patent
Heath

[11] Patent Number: 5,860,641
[45] Date of Patent: Jan. 19, 1999

[54] CUTTING BOARD FOR FOOD PRODUCTS

[76] Inventor: Derek E. Heath, 1380 Coventry La., Vero Beach, Fla. 32967

[21] Appl. No.: 979,490

[22] Filed: Nov. 28, 1997

[51] Int. Cl.[6] ........................................... B23Q 3/00
[52] U.S. Cl. ................... 269/289 R; 269/302.1; 269/900; 269/313; 451/552
[58] Field of Search ............ 269/289 R, 302.1, 269/313, 303, 900; 451/552, 555, 461

[56] References Cited

U.S. PATENT DOCUMENTS

| | | | |
|---|---|---|---|
| D. 348,374 | 7/1994 | Dandurand . | |
| 2,826,879 | 3/1958 | Evans | 451/555 |
| 4,759,153 | 7/1988 | Cohen | 451/552 |
| 5,233,793 | 8/1993 | Dandurand . | |
| 5,440,953 | 8/1995 | Gangelhoff et al. | 451/555 |
| 5,527,022 | 6/1996 | Gibson | 269/289 R |
| 5,658,184 | 8/1997 | Hoopman et al. | 451/552 |
| 5,683,292 | 11/1997 | Young | 451/552 |

FOREIGN PATENT DOCUMENTS

| | | | |
|---|---|---|---|
| 2038614 | 7/1980 | United Kingdom | 451/461 |

*Primary Examiner*—James G. Smith
*Assistant Examiner*—Lee Wilson
*Attorney, Agent, or Firm*—Bell Seltzer Intellectual Property Law Group of Alston & Bird LLP

[57] ABSTRACT

A cutting board for cutting food products which is composed of a plurality of abrasive inserts arranged in parallel rows. In use, the knife blade is drawn along the channel formed between the adjacent rows, and the contact between the knife blade and the abrasive inserts acts to sharpen the knife blade on both of its sides.

12 Claims, 2 Drawing Sheets

CUTTING BOARD FOR FOOD PRODUCTS

BACKGROUND OF THE INVENTION

The present invention relates to a cutting board for cutting food products, and a method of fabricating the same.

Cutting boards of the described type typically comprise a block of hardwood, or a rigid sheet of hard plastic or other similar material. The food product is placed upon the cutting board, and the knife or cleaver is drawn through the food product while the food product is held down by the hand of the operator, or some other instrument which is held by the operator, so as to prevent shifting and slipping.

The juices exuded from many food products, such as meats, render it difficult to prevent shifting and slipping of the product on the board, and the juices can also create an unclean environment. Also, the contact between the edge of the moving knife and the cutting board results in a rapid dulling of the knife edge, and the knife must be sharpened at frequent intervals.

It is an object of the present invention to provide an improved cutting board for food products which not only assists in supporting the food product in a non-slip manner, but which is also able to separate and collect the natural juices of the food product for easy removal.

It is a further object of the present invention to provide a cutting board of the described type which is able to sharpen the knife during use and thereby avoid the separate sharpening operations.

It is still another object of the present invention to provide a cutting board which is totally impervious to the juices encountered during the cutting operation, and which is easy to clean.

SUMMARY OF THE INVENTION

The above and other objects and advantages of the present invention are achieved by the provision of a cutting board which comprises a generally flat support surface, and a plurality of inserts formed of an abrasive material mounted on the support surface. Each of the inserts has a base, a vertex located centrally above the base, and a peripheral surface which extends downwardly from the vertex to the base in an inclined direction.

The inserts are mounted in a contiguous side by side relation on the support surface so as to define a plurality of parallel rows of inserts, and each pair of adjacent rows defines a channel along which a knife blade may be drawn, and such that the knife blade is sharpened on both sides by contact with the inclined peripheral surfaces of the inserts of the adjacent rows.

Preferably, the inserts are arranged on the board to define groups of rows which extend in different directions, with the adjacent rows of each group defining channels which are each adapted to receive the knife blade.

The inserts of the cutting board may take a variety of specific shapes, and they may be fabricated from a variety of abrasive materials, although a ceramic material is preferred. Also, the cutting board may be fabricated by first fabricating a plurality of generally rectangular panels which are each composed of a plurality of the inserts arranged as described above, and then assembling the panels in an end-to-end and side-by-side arrangement so as to form a complete cutting board of a given length and width. The panels may be separately formed as integral units, or they may be formed by first separately forming the inserts and then adhesively securing the inserts together to form a panel.

BRIEF DESCRIPTION OF THE DRAWINGS

Some of the objects and advantages of the present invention having been stated, others will appear as the description proceeds, when considered in conjunction with the accompanying drawings, in which.

DETAILED DESCRIPTION OF THE PREFERRED EMBODIMENTS

Figure 1:
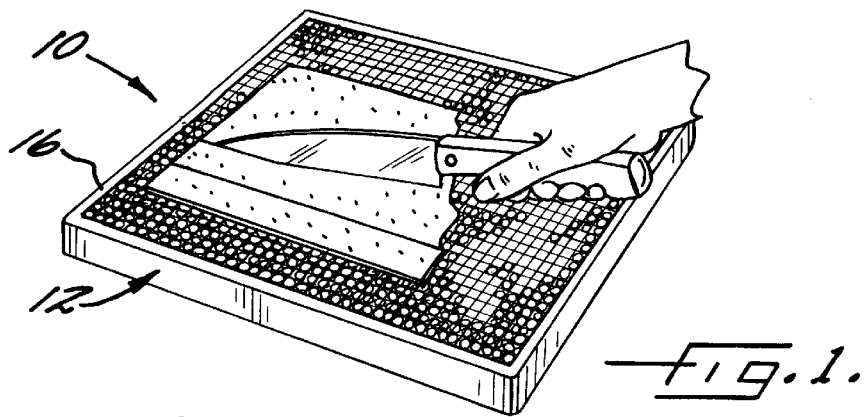
FIG. 1 is a perspective view of a cutting board which embodies the features of the present invention.

FIG. 1 illustrates at 10 a cutting board which embodies the features of the present invention. In the illustrated embodiment, the board includes a rectangular support frame 12 which is composed of a bottom wall 13 defining an upper support surface 14, and four upstanding side walls 16. The frame 12 can be fabricated from wood or plastic, but it is preferably molded or otherwise formed as an integral unit from a suitable ceramic or similar material, such as Corian® as sold by duPont.

The support surface 14 supports a plurality of inserts 20 formed of an abrasive material, with each of the inserts having a base 21, a vertex located centrally above the base, and a peripheral surface 23 which extends downwardly from the vertex 22 to the base 21 in an inclined direction. In the embodiment shown in FIGS. 2–3, the base 21 of each of the inserts is in the form of a right circular cylinder, and the peripheral surface 23 of each of the inserts is in the form of a hemisphere, with the upper extremity of the hemisphere defining the vertex 22.

The inserts 20 may be separately press formed or cast in a conventional manner from a suitable ceramic material, as further described below. After being formed, inserts are then adhesively secured on the support surface, utilizing a suitable adhesive 25, such as epoxy.

Figures 2, 3:
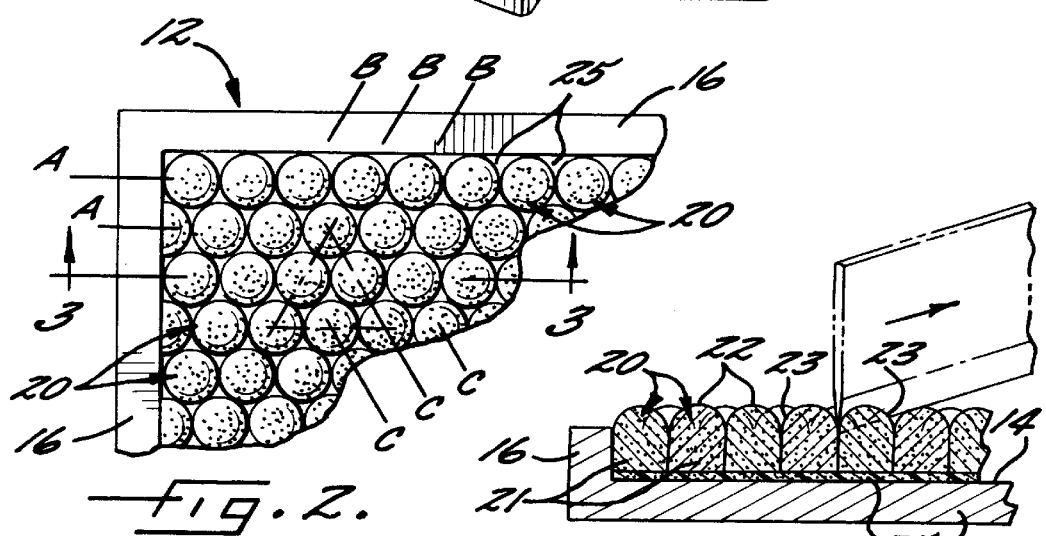
FIG. 2 is an enlarged fragmentary top plan view of the cutting board shown in FIG. 1.
FIG. 3 is a sectional view taken substantially along the line 3—3 of FIG. 2.

The inserts 20 are mounted in contiguous side-by-side relation on the support surface so as to define a plurality of parallel rows A of inserts, and wherein each pair of adjacent rows define a channel along which a knife blade may be drawn and such that both sides of the knife blade are sharpened by their contact with the inclined peripheral surfaces 23 of the inserts of the adjacent rows, note FIG. 3.

FIG. 2 illustrates that the inserts 20 are mounted in three groups of rows A, B, and C. The groups extend in different directions which are angularly spaced apart by 60°. Thus the inserts of each row of each group are aligned with respective inserts of the adjacent rows of the same group along lines which are at a 60° angle with respect to the direction of the rows of the group.

Figures 4, 5:
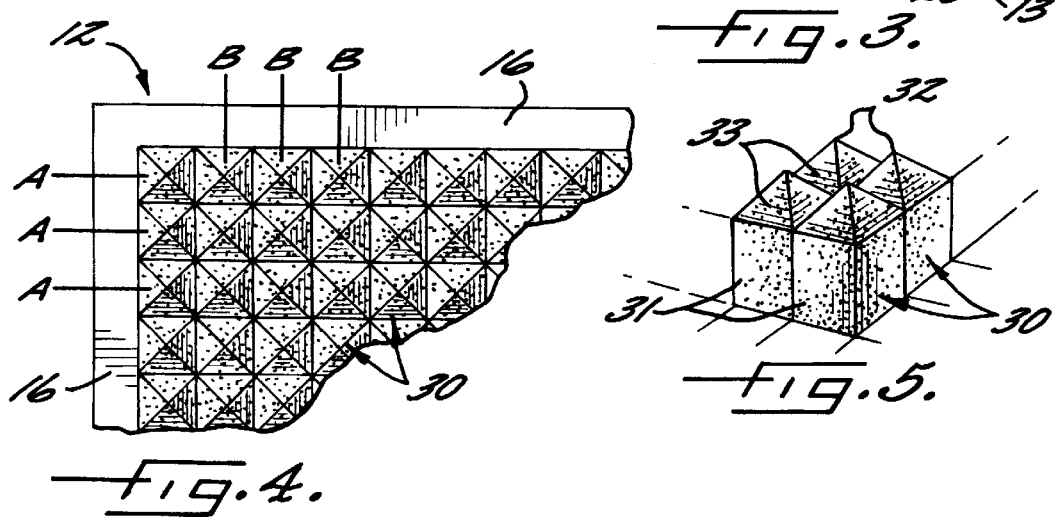
FIG. 4 is a view similar to FIG. 2, but illustrating a second embodiment of the invention.
FIG. 5 is a fragmentary perspective view of the inserts of the embodiment of FIG. 4.

FIGS. 4 and 5 illustrate a second embodiment of the invention wherein the base 31 of the inserts 30 is in the form of a rectangular solid, and wherein the peripheral surface 33 of each of the inserts is in the form of four triangles that meet at the vertex 32. In this embodiment, the inserts 30 of each row are aligned with respective inserts of the adjacent rows along lines which are perpendicular to the direction of the row. Thus, the inserts are mounted in two groups of rows A and B, which are perpendicular to each other.

Figure 6:
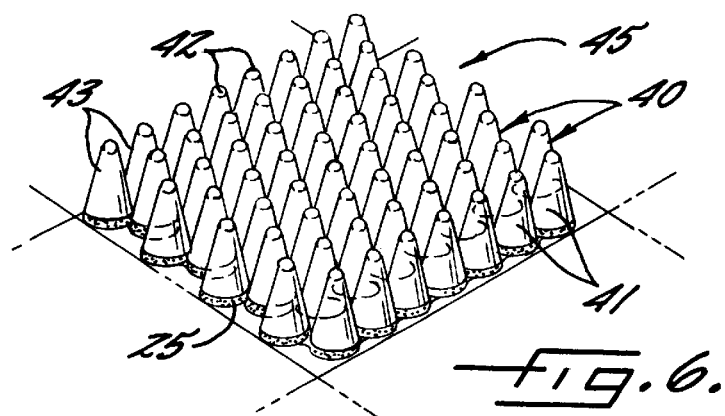
FIG. 6 is a perspective view of a rectangular panel composed of a plurality of inserts of generally conical configuration.
Figure 7:
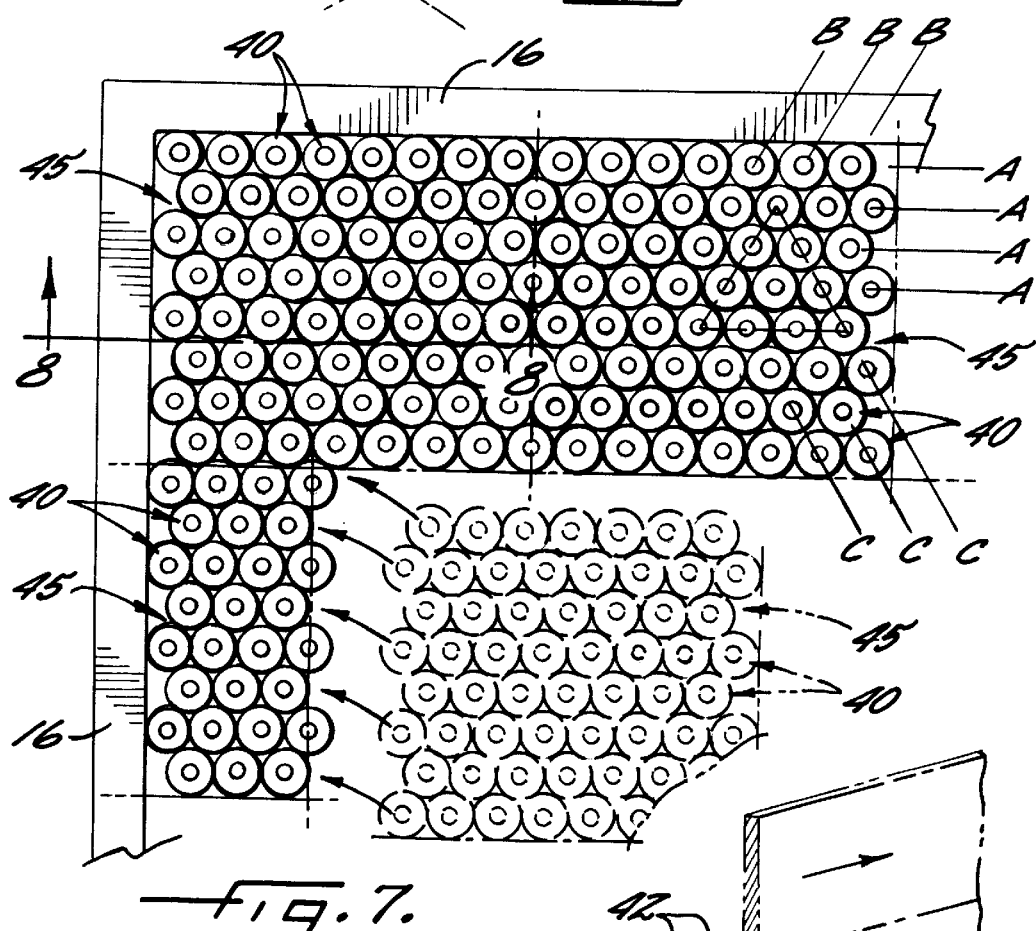
FIG. 7 is a view similar to FIG. 2 and illustrating the manner in which the panels of FIG. 6 are assembled together to form the cutting board surface.
Figure 8:
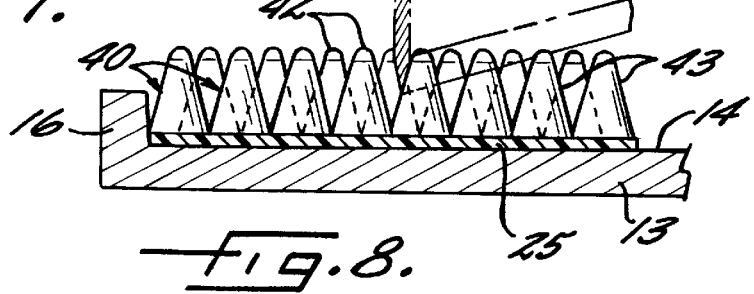
FIG. 8 is a sectional view taken substantially along the line 8—8 of FIG. 7.

FIGS. 6–8 illustrate an embodiment wherein the inserts 40 are each of generally conical configuration and have a circular base 41 and a rounded vertex 42. The peripheral surfaces 43 is in the form of a section of a cone. Also, the conical inserts typically have a base diameter of about ¼ inch, and a height of about ⅜ inch. Further, the conical inserts are arranged in three groups of rows A, B, and C, and as described above with respect to FIGS. 2–3.

FIG. 7 illustrates an alternative assembly process for assembling the inserts onto the support surface. In this embodiment, the inserts are first fabricated into a plurality of generally rectangular panels 45 having opposite ends and opposite sides. The panels are then assembled in an end-to-end and side-by-side arrangement as seen in FIG. 7 so as to define a cutting board surface of substantial size.

The panels may be press formed or cast from a suitable ceramic material as an integral unit, or alternatively, they may be fabricated by first forming the individual inserts and then adhesively securing the molded inserts together with an epoxy adhesive 25 or the like which overlies the bases of the inserts. The panels may then be joined to the support surface, again using an epoxy adhesive or the like.

The panels 45 are generally rectangular in outline, and they may be of any convenient size, such as 1"×1", 2"×2", 2"×4", etc. Also, since the inserts are arranged to define three groups of rows A, B, C, which continue across all of the panels, the knife blade may be drawn along each of the channels formed by the rows of any one of the three groups of rows. In addition, as best seen in FIG. 8, the knife blade is precluded from engaging the bottom valley of the channels, by its engagement with the inclined peripheral surfaces 43 of the inserts 40. This is believed to provide a more efficient sharpening action.

The ceramic inserts can be manufactured of several material compositions. One suitable composition comprises 96% Alumna S697 as supplied by Saxonburg Ceramics of Monroe, N.C., and which comprises a ground ceramic powder having a consistency similar to that of talcum powder.

The inserts 20, 30, 40, or the panels 45, or an entire cutting board 10, may be fabricated by one of at least two otherwise conventional ceramic manufacturing processes. A first such process, referred to as the standard ceramic dry pressing method, involves the following steps:

A. The ceramic powder is placed in a female mold of the desired part. The powder can include a suitable colorant, if desired.

B. A press is activated so as to compress the powder into the mold under sufficient pressure to form the powder into a solid part which conforms to the shape of the mold.

C. The part is removed from the mold and placed in an oven where the part is fired at about 3000 degrees F. for 20–24 hours to achieve proper fusion.

D. The part is then polished to remove any rough edges or imperfections on the part, which can be performed by hand, or by tumbling, or by sandblasting.

E. The parts are finally inspected and sent to assembly or inventory.

A second manufacturing process which is suitable for manufacturing the elements, panels, or the entire cutting board, involves the casting of the parts, and includes the following steps:

A. The ceramic powder and a suitable colorant are mixed with water to produce a paste (approximately 2 parts powder to 1 part water).

B. The paste is poured into a female mold of the part, and the mold is vibrated for 20–30 seconds to completely fill the mold and remove any air pockets that may be trapped in the mold.

C. Curing in the mold takes up to 24 hours at room temperature, or heat can be applied to speed the cure time.

D. After curing, the parts are removed from the mold and inspected for defects caused by air bubbles or an improperly filled mold. Any excess material can also be trimmed.

E. The parts are next heat treated, at approximately 3000 degrees F. for 20–24 hours, to achieve proper fusion of the ceramic mixture.

F. The parts are next polished to remove any rough edges or imperfections on the parts, which can be performed by hand, or by tumbling, or by sandblasting.

G. The parts are finally inspected and sent to assembly or inventory.

Where the manufactured parts are separate inserts 20, 30, 40, the inserts are assembled onto the surface 14 of the cutting board to form the patterns of rows as described above, and the inserts are permanently secured to the surface by epoxy or other suitable adhesive.

The inserts may alternatively be first assembled into rectangular panels 45 as seen in FIG. 6, with the inserts of the panels being bound together by a layer of epoxy 25 underlying the bases of the inserts. The rectangular panels may then be assembled onto the surface of the frame of the cutting board in the manner illustrated in FIG. 7, utilizing additional epoxy to secure the panels onto the surface.

Where the manufactured parts are initially in the form of integral rectangular panels 45 as seen in FIG. 6, the initial layer of epoxy is of course eliminated, since the panels each will be in the form of an integral part as pressed or cast. The panels are then joined to the surface 14 of the frame of the cutting board by epoxy as described above.

In use, the food product F is laid upon the upper surface of the board as seen in FIG. 1, and the knife is drawn across the food product so as to be aligned with one of the groups of rows A, B, or C. More particularly, the knife blade falls into the channel formed between the adjacent rows of the group, and the sliding contact between the knife blade and the inserts in the rows on opposite sides of the knife blade, acts to sharpen the knife blade on both sides thereof. Also, the contact between the relatively pointed vertexes of the inserts and the food product serves to prevent shifting of the food product, and any exuded juices will collect between the inserts and in the cavity defined by the upstanding walls of the frame. These juices may later be removed by washing the board in a sink or dishwasher. The fact that the above described ceramic materials are totally impervious to the juices exuded from the food products being cut, greatly facilitates the cleaning of the board.

While the term "abrasive" has been used herein to describe the texture of the surface of the inserts, it will be appreciated that this term is intended to encompass a surface texture which is relatively smooth to the touch, and so as to impart more of a burnishing action to the knife blade edge as it is drawn along one of the channels.

In the drawings and specification, there has been set forth a preferred embodiment of the invention, and although specific terms are employed, they are used in a generic and descriptive sense only and not for purposes of limitation.

That which is claimed is:

1. A cutting board for cutting food products and which is characterized by the ability to sharpen a knife during use, and comprising a generally flat support surface, a plurality of inserts formed of an abrasive material, with each of said inserts having a base, a vertex located centrally above said base, and a peripheral surface which extends downwardly from said vertex to said base in an inclined direction, said inserts being mounted in a contiguous side by side relation on said support surface so as to define a plurality of parallel rows of inserts, and wherein each pair of adjacent rows defines a channel along which a knife blade may be drawn and such that the knife blade is sharpened on both sides by contact with the inclined peripheral surfaces of the inserts of the adjacent rows.

2. The cutting board as defined in claim 1 wherein the base of each of said inserts is in the form of a right circular cylinder, and wherein the peripheral surface of each of said inserts is in the form of a hemisphere.

3. The cutting board as defined in claim 2 wherein the inserts of each row are aligned with respective inserts of the adjacent rows along lines which are at a 60 degree angle with respect to the direction of the row.

4. The cutting board as defined in claim 1 wherein the base of each of said inserts is in the form of a rectangular solid, and wherein the peripheral surface of each of said insets is in the form of four triangles that meet at said vertex.

5. The cutting board as defined in claim 4 wherein the inserts of each row are aligned with respective inserts of the adjacent rows along lines which are perpendicular to the direction of the row.

6. The cutting board as defined in claim 1 wherein said inserts are each of generally conical configuration and have a circular base and a rounded vertex.

7. The cutting board as defined in claim 6 wherein the inserts of each row are aligned with respective inserts of the adjacent rows along lines which are at a 60 degree angle with respect to the direction of the row.

8. The cutting board as defined in claim 1 wherein the inserts comprise a molded ceramic material.

9. The cutting board as defined in claim 8 wherein the peripheral surface of the inserts is polished.

10. A cutting board for cutting food products and which is characterized by the ability to sharpen a knife during use, and comprising a generally flat support surface, a plurality of inserts formed of an abrasive material, with each of said inserts having a base, a vertex located centrally above said base, and a peripheral surface which extends downwardly from said vertex to said base in an inclined direction, said inserts being mounted in a contiguous side by side relation on said support surface so as to define a plurality of groups of parallel rows which extend in different directions, and wherein each of the adjacent rows of each group define a channel along which a knife blade may be drawn and such that the knife blade is sharpened on both sides by contact with the inclined peripheral surfaces of the inserts of the adjacent row.

11. The cutting board as defined in claim 10 wherein the inserts are mounted so as to define three groups of parallel rows which intersect each other at 60 degree angles.

12. The cutting board as defined in claim 10 wherein the inserts are mounted so as to define two groups of parallel rows which perpendicularly intersect each other.

* * * * *